United States Patent
Harms, Jr. et al.

(10) Patent No.: US 9,555,732 B2
(45) Date of Patent: Jan. 31, 2017

(54) BUNK BOARD COVER SYSTEM

(71) Applicants: Dennis Harms, Jr., Covington, GA (US); Robert Ellingson, Social Circle, GA (US)

(72) Inventors: Dennis Harms, Jr., Covington, GA (US); Robert Ellingson, Social Circle, GA (US)

(73) Assignee: REESE ENTERPRISES, INC., Covington, GA (US)

( * ) Notice: Subject to any disclaimer, the term of this patent is extended or adjusted under 35 U.S.C. 154(b) by 849 days.

(21) Appl. No.: 13/924,822

(22) Filed: Jun. 24, 2013

(65) Prior Publication Data
US 2014/0377045 A1    Dec. 25, 2014

(51) Int. Cl.
*B60P 3/10*    (2006.01)

(52) U.S. Cl.
CPC .................................. *B60P 3/1066* (2013.01)

(58) Field of Classification Search
CPC .................................................. B60P 3/1066
USPC ................. 224/325, 326; 280/414.1; 284/42
See application file for complete search history.

(56) References Cited

U.S. PATENT DOCUMENTS

| | | | | |
|---|---|---|---|---|
| 5,002,299 | A * | 3/1991 | Firehammer | B60P 3/1066 280/414.1 |
| 5,133,570 | A * | 7/1992 | Godbersen | B60P 3/1066 248/185.1 |
| 5,993,063 | A | 11/1999 | Stewart | |
| 6,189,909 | B1 | 2/2001 | Danchuk | |
| 6,651,997 | B2 * | 11/2003 | Higginson | B60P 3/1066 280/414.1 |
| 6,830,410 | B2 * | 12/2004 | Davidson | B63C 3/06 280/414.1 |
| 7,413,209 | B2 * | 8/2008 | MacKarvich | B60P 3/1066 280/414.1 |
| 7,584,981 | B2 * | 9/2009 | Vonderahe | F16F 1/373 280/414.1 |

* cited by examiner

*Primary Examiner* — Jacob Knutson
(74) *Attorney, Agent, or Firm* — Smith Tempel Blaha LLC; Matthew T. Hoots

(57) ABSTRACT

Disclosed are hinged and non-hinged bunk board cover systems for mating over a bunk board component of a watercraft trailer. An exemplary hinged embodiment includes a main contact surface component sized to substantially cover a top surface of the bunk board component and a pair of side fastener surface components connected to the main contact surface component via a pair of hinge components. The main contact surface component, hinge components and side fastener surface components may be co-extruded into a single, "cut to length" ribbon that can be formed into a bulk roll. It is envisioned that certain embodiments may be constructed from thermoplastics, thermoplastic elastomers, or a combination thereof.

9 Claims, 7 Drawing Sheets

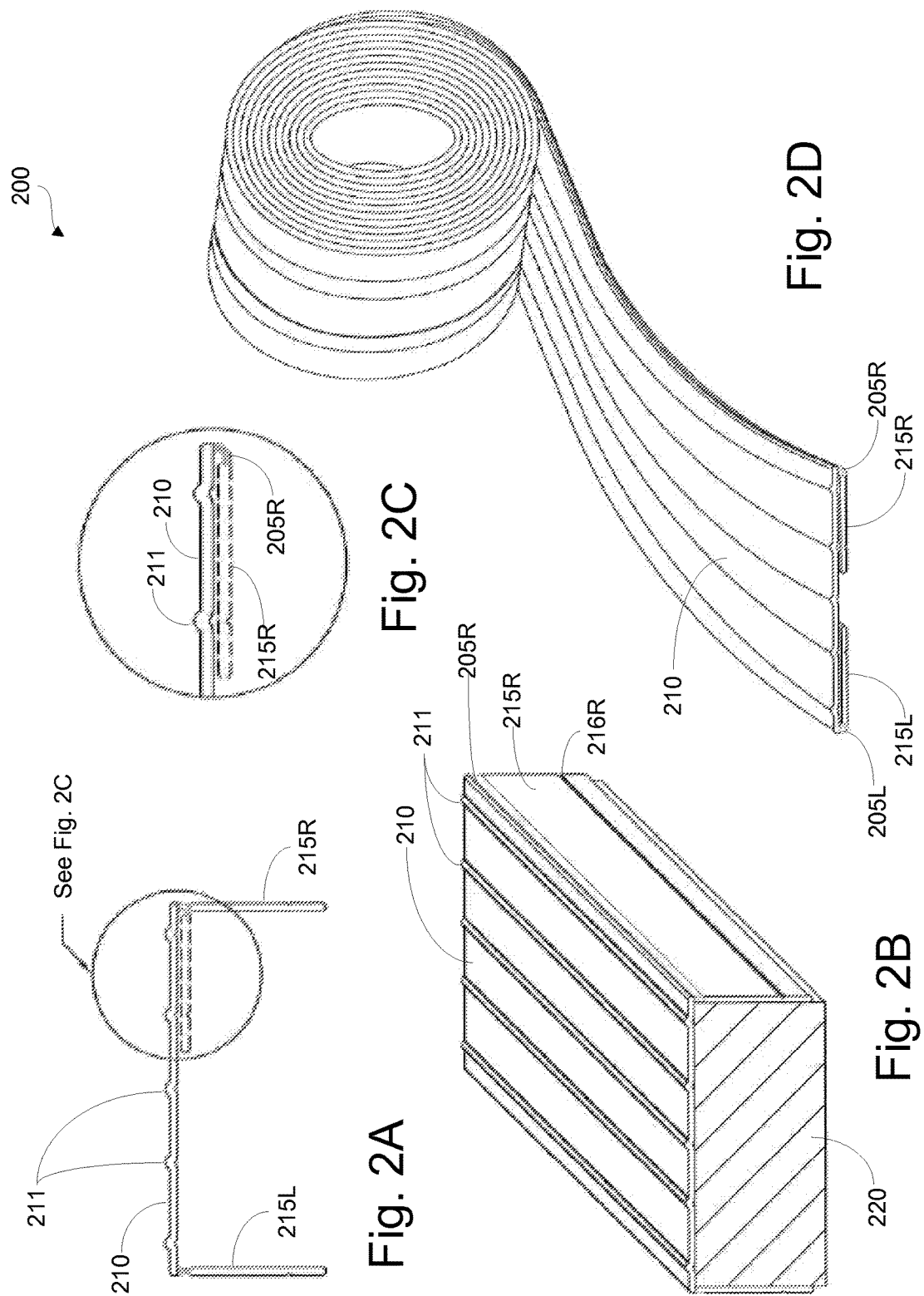

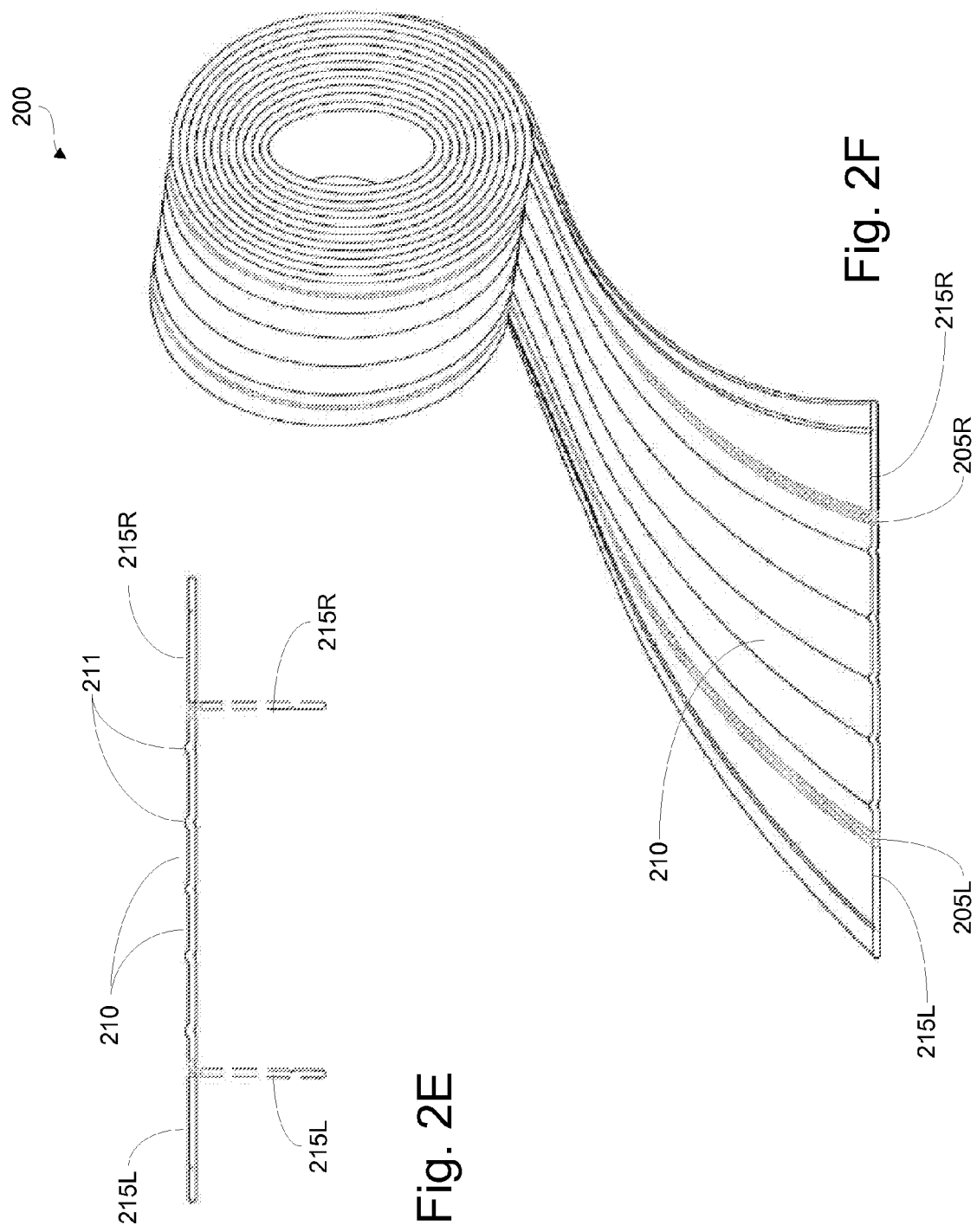

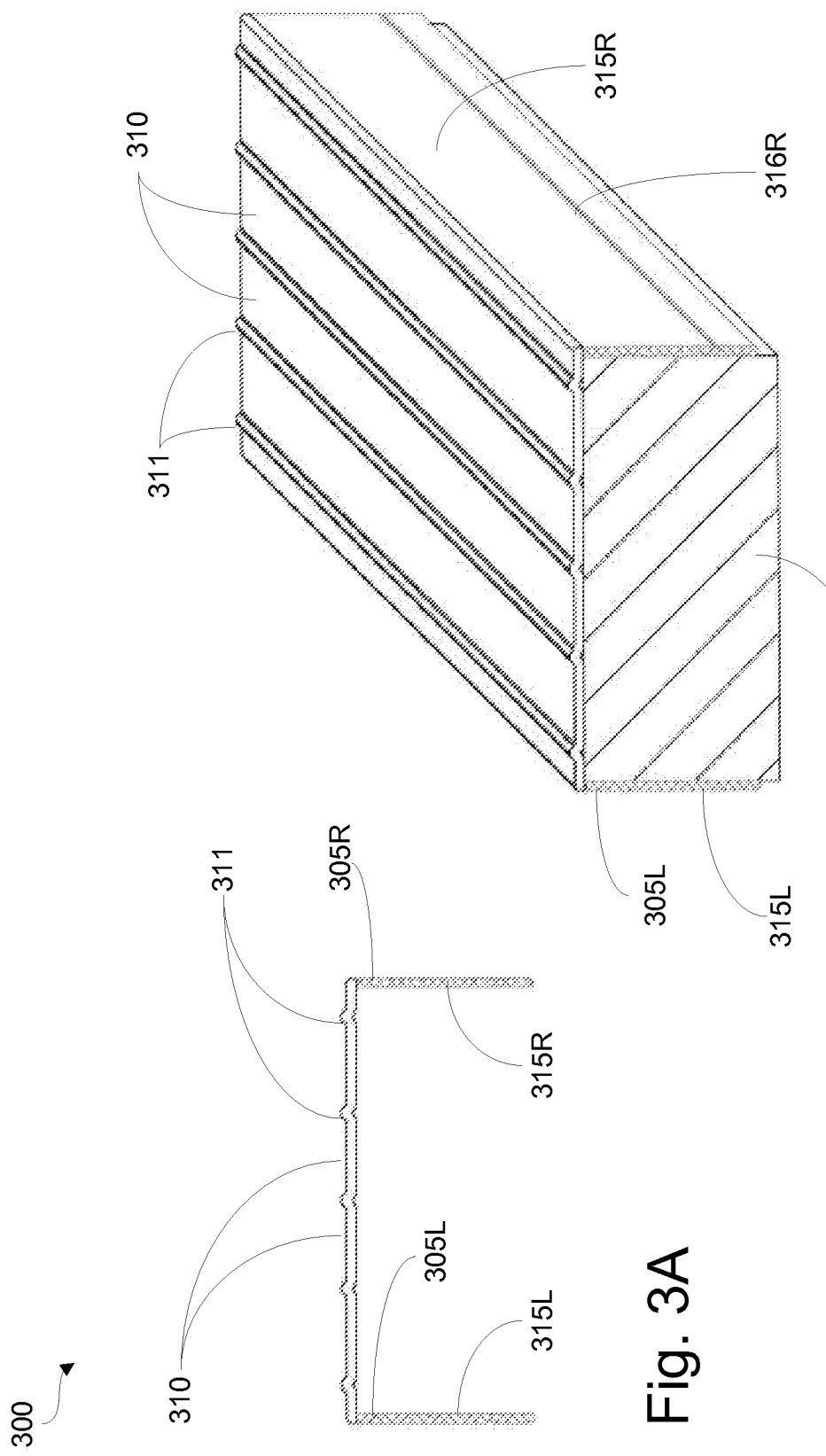

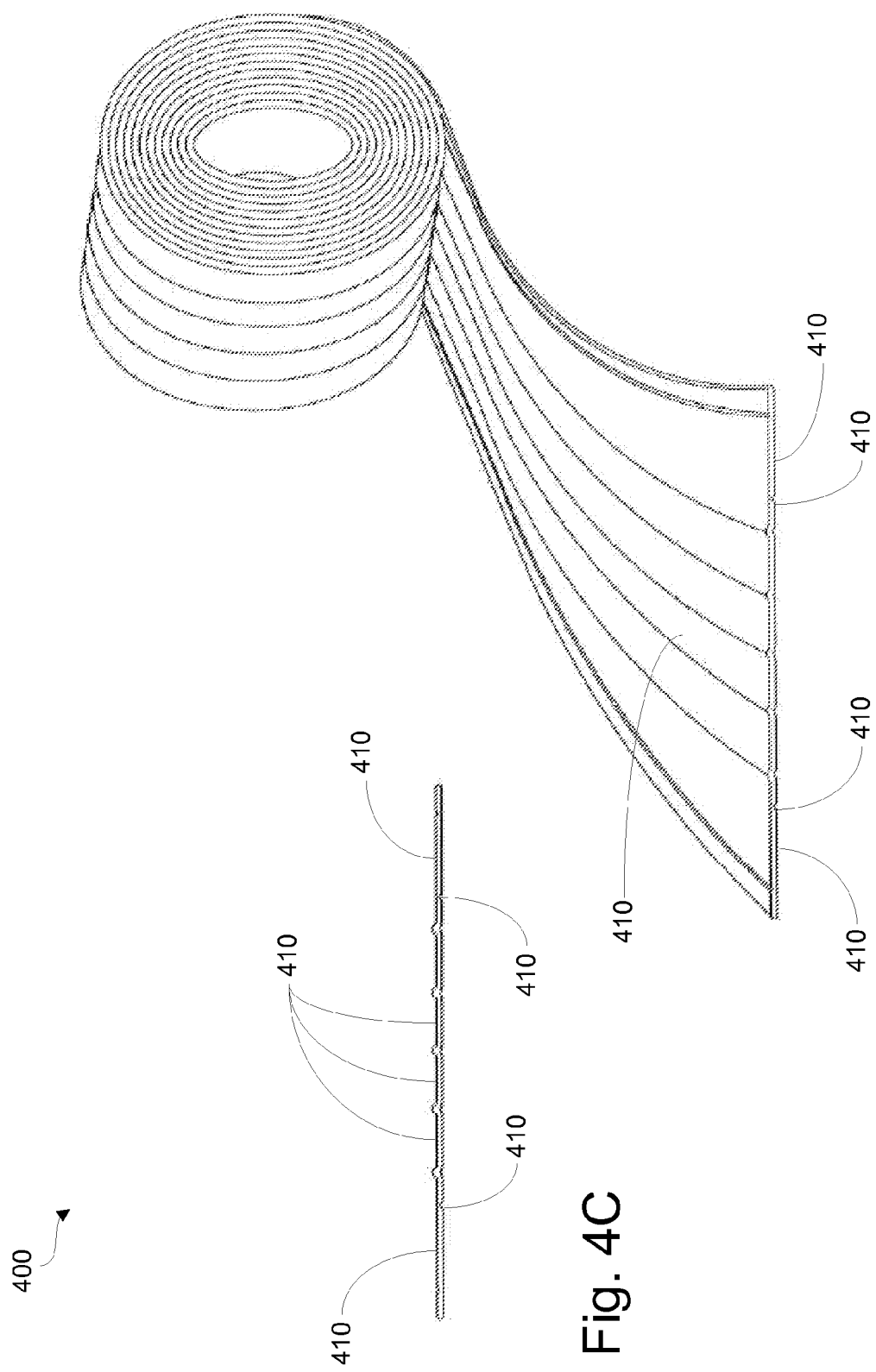

BUNK BOARD COVER SYSTEM

BACKGROUND

Embodiments of the present system are generally directed to the field of protective covers for structural components and, more specifically, to systems for providing a protective cover for bunk board components of trailers used for transporting watercraft.

Commonly, trailers designed for the transport of watercraft will include a pair or more of bunk boards, or "runners," that are anchored to the trailer's frame. The bunk boards are positioned to contact the underside of the watercraft and provide support such that the watercraft "sits" on the bunk boards when loaded on the trailer. Most bunk boards run longitudinally from front to back of the trailer frame so that when the boat is loaded onto the frame the bunk boards extend substantially from the bow of the watercraft to its stern.

To load a watercraft on a trailer that has bunk boards, the trailer is backed into the water until the bunk boards are inclined and mostly submerged just beneath the water's surface. The watercraft can then be powered onto the trailer until its weight is supported by the bunk boards. Next, the trailer is pulled from the water with the watercraft sitting atop it. Similarly, to unload a watercraft from a trailer, the trailer is backed into the water until the buoyancy of the watercraft causes it to float off of the trailer's bunk boards.

As one of ordinary skill in the art understands, repeatedly loading and unloading a watercraft from a trailer may cause wear and tear on both the bunk boards as well as the hull of the watercraft. Also, a high coefficient of friction between the bunk boards and the hull of the watercraft can make loading the watercraft onto, and off of, the trailer a difficult task. Therefore, what is needed in the art is a bunk board cover system that protects the bunk boards while reducing the coefficient of friction with the hull of a watercraft. Further, what is need in the art is a bunk board cover system that can be manufactured and shipped in a compact and cost efficient manner. Even further, what is needed in the art is a bunk board system that can be "cut to length" in the field to accommodate different bunk board applications.

These needs, as well as other needs in the art, are addressed in the various embodiments of the invention as presented herein.

BRIEF SUMMARY

The various embodiments, features and aspects of the present invention overcome and/or fill some or all of the above-noted needs in the prior art. Embodiments include hinged and non-hinged bunk board cover systems for mating over a bunk board component of a watercraft trailer. An exemplary hinged embodiment includes a main contact surface component sized to substantially cover a top surface of the bunk board component and a pair of side fastener surface components connected to the main contact surface component via a pair of hinge components. The main contact surface component, hinge components and side fastener surface components may be co-extruded into a single, "cut to length" ribbon that can be formed into a bulk roll.

The hinge components may be comprised of a material that is durable, yet more flexible than the material used for the main contact surface component. In this way, the hinge components may operate to position the side fastener surface components relative to the main contact surface component such that each contacts a side surface of the bunk board. In some embodiments, the hinge components may be integral to the side fastener surface components by virtue of being constructed from a common material. It is envisioned that certain embodiments may be constructed from thermoplastics, thermoplastic elastomers, or a combination thereof.

The above-described and additional features may be considered, and will become apparent in conjunction with the drawings, in particular, and the detailed description which follow.

BRIEF DESCRIPTION OF THE SEVERAL VIEWS OF THE DRAWING

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 2A-2F illustrate an embodiment of a hinged bunk board cover system that includes hinge components constructed from a material different from that used for the main contact surface component and side fastener surface components;

FIGS. 3A-3B illustrate an embodiment of a hinged bunk board cover system that includes hinge components that are integral with, and constructed from the same material as, the side fastener surface components;

FIGS. 4A-4D illustrate an embodiment of a hinged bunk board cover system constructed from a single material.

DETAILED DESCRIPTION

The present disclosure is directed towards providing a bunk board cover system that can be retrofitted onto a bunk board of a watercraft trailer to protect both the bunk board and the watercraft which is loaded on top of it. Embodiments of the bunk board cover system may be manufactured via extrusion and formed into bulk rolls which are compact and efficiently shipped. In application, a desired length of a bunk board cover system may be cut from a bulk roll and fixed onto a bunk board of a watercraft trailer. Advantageously, once fixed to a bunk board, a bunk board cover system provides a level of protection to the bunk board against wear and tear from loading and unloading watercraft. Further, it is envisioned that embodiments of a bunk board cover system will be manufactured from materials that are resilient, rugged and flexible yet have physical properties that reduce the coefficient of friction between the bunk board and a loaded watercraft, thereby providing for relatively easier loading and unloading of a watercraft from a trailer.

Turning now to the figures in which like labels refer to like elements throughout the several views, various embodiments, aspects and features of the present invention are presented.

Figure 1:
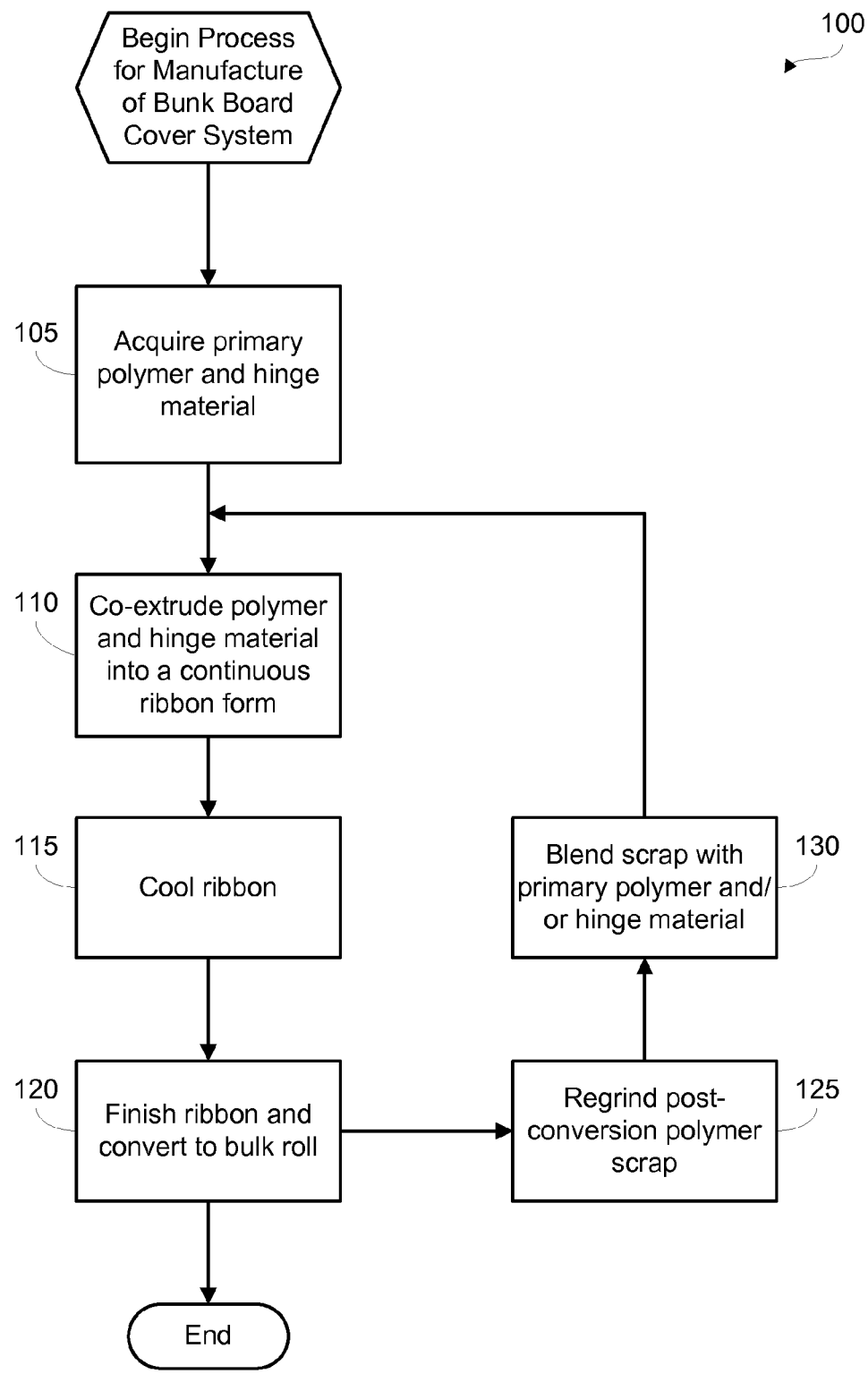
FIG. 1 is a logical flowchart illustrating an exemplary process for manufacture of a bunk board cover system.

FIG. 1 is a logical flowchart illustrating an exemplary process 100 for manufacture of an embodiment of a bunk board cover system. At block 105, a primary polymer and a thermoplastic elastomer are acquired. As will become apparent from the present description, the primary polymer will form a main contact surface component as well as side fastener surface components of the bunk board cover system and the thermoplastic elastomer will form the hinge components of the bunk board system. It is envisioned that the primary polymer may be any material recognized by one of ordinary skill in the art to be suitable for forming a main contact surface component and/or a side fastener surface component of a bunk board cover system including, but not limited to, a thermoplastic polymer such as polypropylene, polyethylene, acrylonitrile butadiene styrene ("ABS"), polyvinyl chloride ("PVC") etc. It is also envisioned that the thermoplastic elastomer may be any material that is suitably durable for the hinge component function of a bunk board cover system and is at least as flexible as, or more flexible than, the primary polymer material. It is envisioned that in some embodiments a single material may be used for the entire bunk board cover system (see FIGS. 4-5). Exemplary materials that may be used in the manufacture of a bunk board cover system that includes a separate hinge component include, but are not limited to, thermoplastic elastomers such as Santoprene® (compound of EPDM rubber and polypropylene), Hytrel® (a thermoplastic polyester elastomer), Alcryn® (chlorinated olefin interpolymer alloy), etc.

Returning to the method 100, the primary polymer and/or the thermoplastic elastomer may be in a pelletized form as would be understood by one of ordinary skill in the art, although the particular form of the primary polymer and/or the thermoplastic elastomer is envisioned to be any form suitable for input into the process 100 or an alternative manufacturing process. At block 110, the primary polymer and the thermoplastic elastomer may be input to an extruder, where they are pressurized and heated such that they can be co-extruded through a die, as is understood by one of ordinary skill in the art of rubber and/or plastic extrusion processes. Having been heated to, or near, a melt point, the primary polymer and the thermoplastic elastomer are forced through a die to form a continuous ribbon having a cross-sectional profile consistent with the shape of the given die. The co-extrusion at block 110 operates to cross-link the primary polymer and the thermoplastic elastomer such that a unitary ribbon is formed. Moreover, as one of ordinary skill in the art would understand, the method 100 may be used with a single material of construction for embodiments of a bunk board cover system that do not include a hinge component made of a material different than the main contact surface component and side fastener surface component.

At block 115, the continuous ribbon is cooled such that the primary polymer and the thermoplastic elastomer regain their memory properties, tensile strength, durability, and the like. As is understood by those of ordinary skill in the art of rubber and/or plastic extrusion, the ribbon may be cooled any number of ways including, but not limited to, exposure to a water bath or air. Once the ribbon is cooled, at block 120 the ribbon may be "cleaned up" by removing excess polymer and rolled into a bulk roll form of finished product, as would be understood by one of ordinary skill in the art. In some embodiments of the method 100, any scrap polymer left over from the conversion at block 120 may be reground at block 125 and blended back into the primary polymer and/or the thermoplastic elastomer at block 130 prior to extrusion at block 110.

Turning to FIG. 2, an embodiment of a hinged bunk board cover system 200 that includes hinge components 205 constructed from a material different from that used for the main contact surface component 210 and side fastener surface components 215 is depicted. Referring to FIG. 2A, a cross-section of the exemplary hinged bunk board cover system embodiment 200 is depicted. A main contact surface component 210 is connected to left and right side fastener surface components 215L, 215R by hinge components 205L, 205R, respectively. As described above, the hinge components 205 may be constructed from a thermoplastic elastomer such as, but not limited to, Santoprene®. The main contact surface component 210 and side fastener surface components 215 may be constructed from a material, or materials, which are more rigid than the hinge material such as, but not limited to, polypropylene.

In application, the hinged bunk board cover system 200 may be fixed to a bunk board 220 such that the bunk board 220 is protected from the elements and wear. As can be seen in the FIG. 2B illustration, the main contact surface component 210 may be of a width that substantially covers the top surface of the bunk board 220 such that the hinge components 205 allow for the side fastener surface components to "lay down" at substantially a ninety degree angle from the main contact surface component 210 to contact the sides of the bunk board 220. As can be further seen in the FIG. 2 illustrations, the side fastener surface components 215 may each include a fastener groove 216 for receiving one or more fasteners (not shown) such as, but not limited to, stainless steel screws, roofing nails, or the like. It is also envisioned that some embodiments of a bunk board cover system may be affixed to a bunk board by use of glues or other fastening means.

Returning to the FIG. 2 illustrations, it is envisioned that some embodiments of a bunk board cover system will include skid ridges 211 on the main contact surface component 210. The skid ridges 211 may further reduce a coefficient of friction when in contact with a watercraft hull as their presence on the main contact surface component may operate to reduce the overall contact area between the bunk board cover system and the watercraft hull. Further, it is envisioned that some embodiments of a bunk board cover system may include a separate material co-extruded to form skid ridges 211 having especially low coefficients of friction, although system embodiments with main contact surface components 210 and skid ridges 211 (if present) formed from polypropylene are envisioned to be suitably "slick" for most applications. As one of ordinary skill in the art would recognize, polypropylene exhibits a relatively high lubricity, especially when wet.

The FIG. 2C illustration is a detailed view of the hinge component 205R. As can be seen in the FIG. 2C illustration, the hinge component 205R may be flexible to such an extent that the side fastener surface component 215R can be translated to a position that is beneath, and substantially in a parallel plane with, the main contact surface component 210. Advantageously, because the side fastener surface components 215 can be translated to a position that is beneath, and substantially in a parallel plane with, the main contact surface component 210, the hinged bunk board cover system 200 may be converted to a bulk roll form, such as that which is illustrated in FIG. 2D. As one of ordinary skill in the art would acknowledge as being desirable, the hinged bunk board cover system 200 may be "cut to length" from the bulk roll in the field to apply to a bunk board.

Alternatively, as can be seen in the FIG. 2E illustration, the hinge components 205 may operate to place the side fastener surface components 215 in a position that is substantially coplanar with the main contact surface component 210. In this way, the hinged bunk board cover system 200 may be formed into a bulk roll, as depicted in FIG. 2F.

Turning to FIG. 3, an embodiment of a hinged bunk board cover system 300 that includes hinge components 305 that are integral with, and constructed from the same material as, the side fastener surface components 315 is depicted. Referring to FIG. 3A, a cross-section of the exemplary hinged bunk board cover system embodiment 300 is depicted. A main contact surface component 310 is connected to left and right side fastener surface components 315L, 315R by hinge components 305L, 305R, respectively. Notably, the hinge components 305 in the exemplary system 300 are integral with the side fastener surface components 315 and are functional by virtue of being formed from a relatively flexible material. In essence, for the exemplary embodiment illustrated in FIG. 3, the hinge components 305 are represented by the portion of the side fastener surface components which are juxtaposed to, and connected to, the edges of the main contact surface component 310. As described above, the hinge components 305 and side fastener surface components 315 may be constructed from a flexible, yet durable, thermoplastic elastomer such as, but not limited to, Santoprene®. The main contact surface component 310 may be constructed from a material, or materials, which are more rigid than the hinge/side fastener surface material such as, but not limited to, polypropylene.

In application, the hinged bunk board cover system 300 may be fixed to a bunk board 320 such that the bunk board 320 is protected from the elements and wear. As can be seen in the FIG. 3B illustration, the main contact surface component 310 may be of a width that substantially covers the top surface of the bunk board 320 such that the hinge components 305 allow for the side fastener surface components 315 to "lay down" at substantially a ninety degree angle from the main contact surface component 310 to contact the sides of the bunk board 320. As can be further seen in the FIG. 3 illustrations, the side fastener surface components 315 may each include a fastener groove 316 for receiving one or more fasteners (not shown) such as, but not limited to, stainless steel screws, roofing nails, or the like. It is also envisioned that some embodiments of a bunk board cover system may be affixed to a bunk board by use of glues or other fastening means.

Returning to the FIG. 3 illustrations, it is envisioned that some embodiments of a bunk board cover system will include skid ridges 311 on the main contact surface component 310. The skid ridges 311 may further reduce a coefficient of friction when in contact with a watercraft hull as their presence on the main contact surface component may operate to reduce the overall contact area between the bunk board cover system and the watercraft hull.

Figures 4A, 4B:
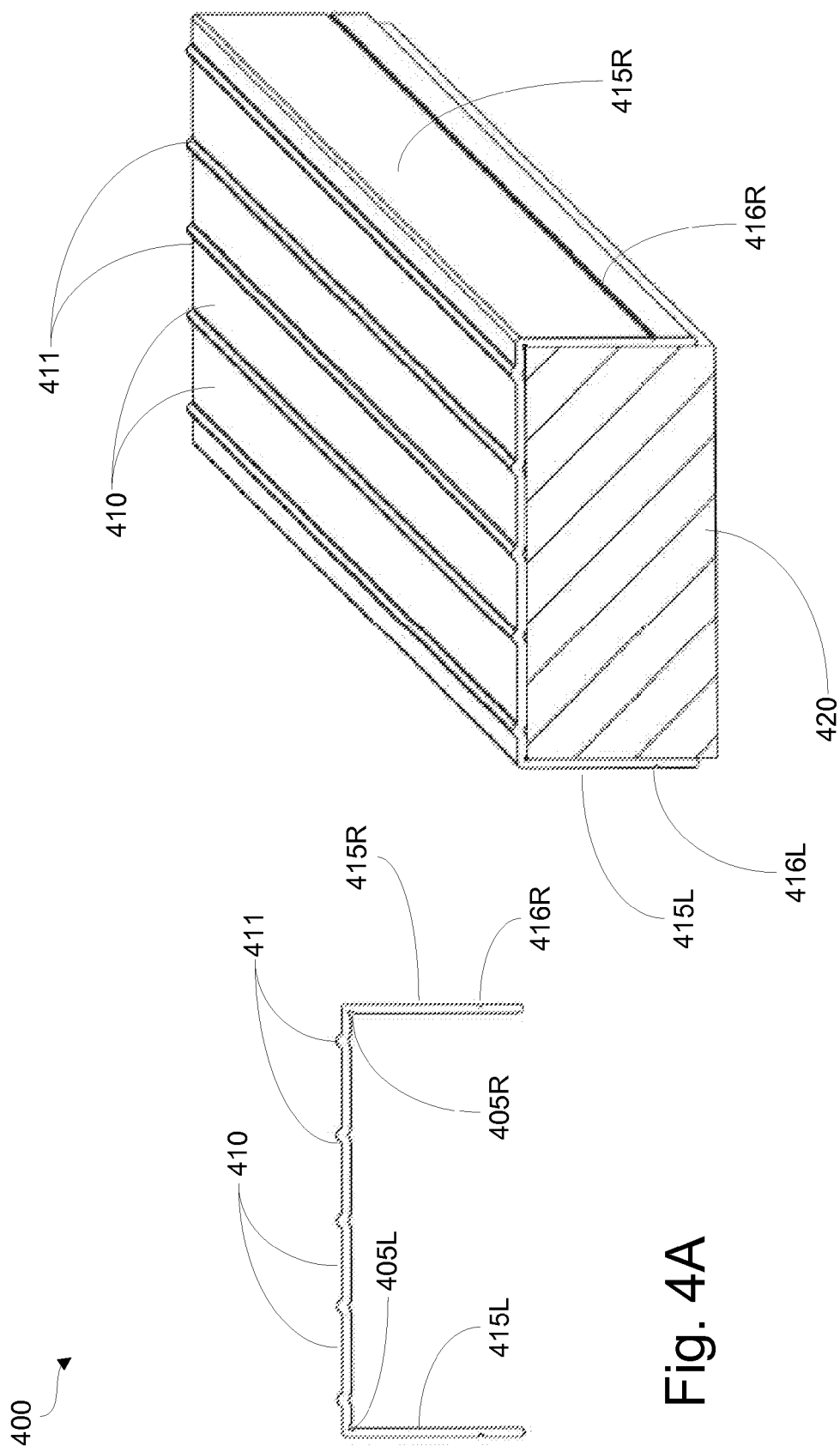

Turning to FIG. 4, an embodiment of a hinged bunk board cover system 400 constructed from a single material is depicted. Referring to FIG. 4A, a cross-section of the exemplary hinged bunk board cover system embodiment 400 is depicted. A main contact surface component 410 is connected to left and right side fastener surface components 415L, 415R by hinge features 405L, 405R, respectively. Notably, the hinge components 405 in the exemplary system 400 are formed by "v-grooves" or chamfered recesses between the underside surfaces of the main contact surface component 410 and side fastener surface components 415. As would be understood by one of ordinary skill in the art, the hinge features 405 are functional by virtue of being an intentional "weak point" in the system 400 that is not as thick as the components 410, 415 which it operates to join. Because the hinge features 405 are formed from strategically placed grooves in the system 400, the entire system 400 may be constructed from a common material such as, but not limited to, a thermoplastic elastomer, a thermoplastic, etc.

In application, the hinged bunk board cover system 400 may be fixed to a bunk board 420 such that the bunk board 420 is protected from the elements and wear. As can be seen in the FIG. 4B illustration, the main contact surface component 410 may be of a width that substantially covers the top surface of the bunk board 420 such that the hinge features 405 allow for the side fastener surface components 415 to "lay down" at substantially a ninety degree angle from the main contact surface component 410 to contact the sides of the bunk board 420. As can be further seen in the FIG. 4 illustrations, the side fastener surface components 415 may each include a fastener groove 416 for receiving one or more fasteners (not shown) such as, but not limited to, stainless steel screws, roofing nails, or the like. It is also envisioned that some embodiments of a bunk board cover system may be affixed to a bunk board by use of glues or other fastening means.

Returning to the FIG. 4 illustrations, it is envisioned that some embodiments of a bunk board cover system will include skid ridges 311 on the main contact surface component 310. The skid ridges 311 may further reduce a coefficient of friction when in contact with a watercraft hull as their presence on the main contact surface component may operate to reduce the overall contact area between the bunk board cover system and the watercraft hull.

As can be seen in the FIG. 4C illustration, the hinged bunk board cover system 400 may be extruded such that the side fastener surface components 415 are coplanar with the main contact surface component 410. Advantageously, the hinged bunk board cover system 400 may be formed into a bulk roll, as depicted in FIG. 4D. As one of ordinary skill in the art would acknowledge as being desirable, the hinged bunk board cover system 400 may be "cut to length" from the bulk roll in the field to apply to a bunk board.

Figures 5A, 5B:
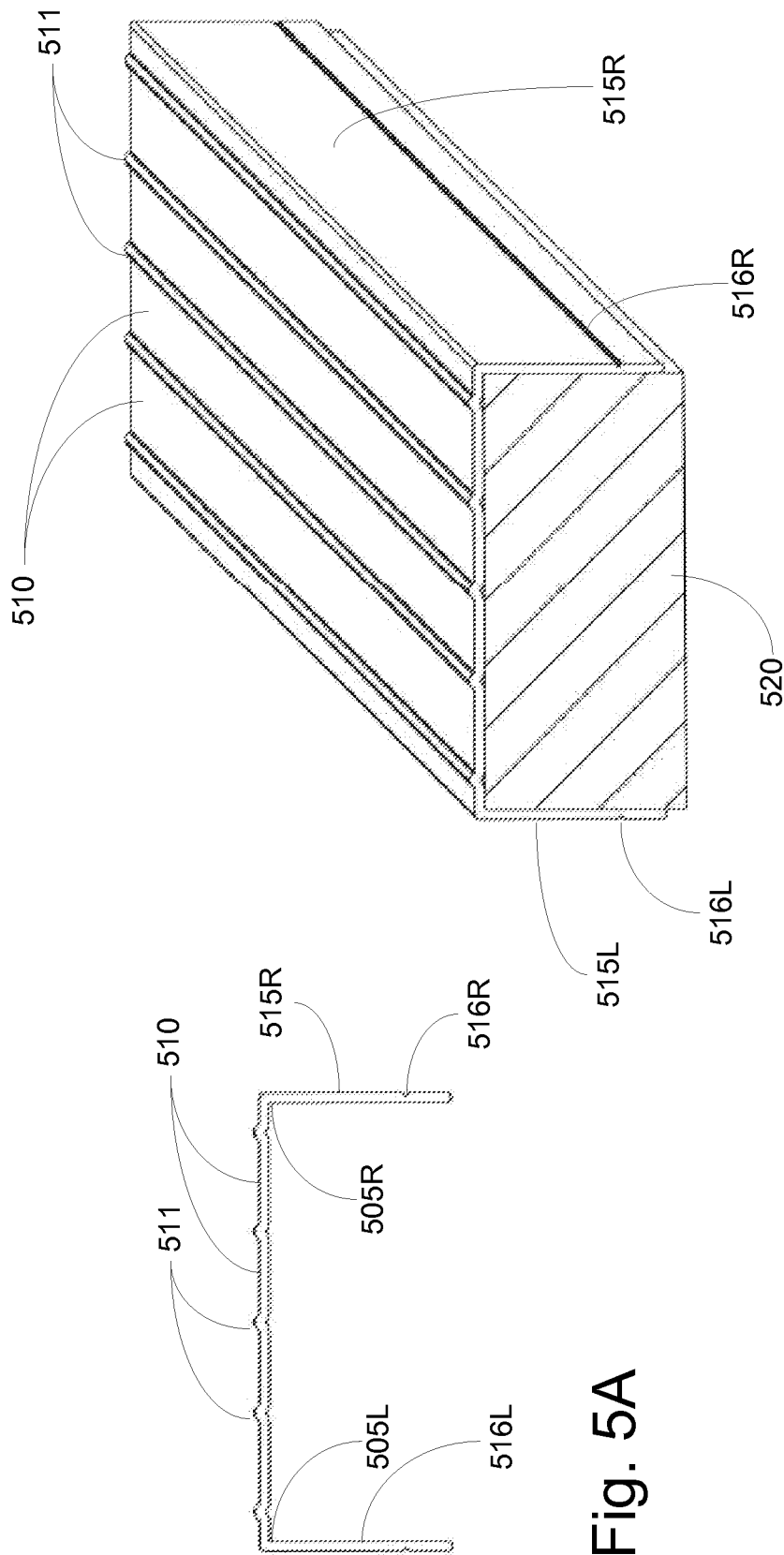
FIGS. 5A-5B illustrate an embodiment of a non-hinged bunk board cover system constructed from a single material.

Turning to FIG. 5, an embodiment of a non-hinged bunk board cover system 500 constructed from a single material is depicted. Referring to FIG. 5A, a cross-section of the exemplary non-hinged bunk board cover system embodiment 500 is depicted. A main contact surface component 510 is connected to left and right side fastener surface components 515L, 515R by rigid corner features 505L, 505R, respectively. Notably, the rigid corner features 505 in the exemplary system 500 are formed at the extrusion of the bunk board cover system 500. As would be understood by one of ordinary skill in the art, the entire system 500 may be constructed from a common material such as, but not limited to, a thermoplastic elastomer, a thermoplastic, etc.

In application, the non-hinged bunk board cover system 500 may be fixed to a bunk board 520 such that the bunk board 520 is protected from the elements and wear. As can be seen in the FIG. 5B illustration, the main contact surface component 510 may be of a width that substantially covers the top surface of the bunk board 520 such that the rigid corner features 505 allow for the side fastener surface components 515 to form substantially a ninety degree angle relative to the main contact surface component 510 and contact the sides of the bunk board 520. As can be further seen in the FIG. 5 illustrations, the side fastener surface components 515 may each include a fastener groove 516 for receiving one or more fasteners (not shown) such as, but not limited to, stainless steel screws, roofing nails, or the like. It is also envisioned that some embodiments of a bunk board cover system may be affixed to a bunk board by use of glues or other fastening means.

Returning to the FIG. 5 illustrations, it is envisioned that some embodiments of a bunk board cover system will include skid ridges 511 on the main contact surface component 510. The skid ridges 511 may further reduce a coefficient of friction when in contact with a watercraft hull as their presence on the main contact surface component may operate to reduce the overall contact area between the bunk board cover system and the watercraft hull.

It is envisioned that embodiments of a bunk board cover system which are similar to the exemplary embodiment 500 may not be easily formed into a bulk roll. As such, it is envisioned that embodiments may be extruded into predetermined lengths that, if not of an optimal length for a given bunk board application, may be customized in the field. Even so, as one of ordinary skill in the art would recognize, an embodiment of a non-hinged bunk board cover system, such as the exemplary system 500, may be suitable for taking the form of a bulk roll if the material of construction was flexible enough to fold the side fastener surfaces 515 to be coplanar with, or in a parallel plane with, the main contact surface component 510. For example, use of a durable, yet flexible, material such as a thermoplastic elastomer may provide for enough flexibility that an embodiment such as system 500 may be bulk rolled.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A hinged bunk board cover system for mating over a bunk board component of a watercraft trailer, the system comprising:
   a main contact surface component sized to substantially cover a top surface of the bunk board component;
   a pair of side fastener surface components; and
   a pair of hinge components, wherein the hinge components are operable to:
      position the side fastener surface components in a plane that is substantially parallel to a plane defined by the main contact surface component; and
      position the side fastener surface components relative to the main contact surface component such that each contacts a side surface of the bunk board component.

2. The hinged bunk board cover system of claim 1, wherein the side fastener surface components further comprise a fastener groove for receiving fasteners to fasten the system to the bunk board component.

3. The hinged bunk board cover system of claim 1, wherein the hinge components are comprised of a thermoplastic polymer.

4. The hinged bunk board cover system of claim 1, wherein the main contact surface component and the side fastener surface components are comprised of polypropylene.

5. The hinged bunk board cover system of claim 1, wherein the hinge components are integral to the side fastener surface components and formed from a same material.

6. The hinged bunk board cover system of claim 5, wherein the material is a thermoplastic elastomer.

7. The hinged bunk board cover system of claim 1, wherein the main contact surface component comprises one or more skid ridges.

8. A hinged bunk board cover system for mating over a bunk board component of a watercraft trailer, the system comprising:
   a main contact surface component sized to substantially cover a top surface of the bunk board component;
   a pair of side fastener surface components; and
   a pair of hinge components, wherein the hinge components are operable to:
      position the side fastener surface components coplanar with the main contact surface component; and
      position the side fastener surface components relative to the main contact surface component such that each contacts a side surface of the bunk board component.

9. The hinged bunk board cover system of claim 8, wherein the hinge components are formed via grooves in the system that define a weak point between the main contact surface component and the side fastener surface components.

* * * * *